(12) United States Patent
Nestler

(10) Patent No.: US 11,142,714 B2
(45) Date of Patent: Oct. 12, 2021

(54) HIGHLY EFFICIENT AND COMPACT SYNGAS GENERATION SYSTEM

(71) Applicant: Helge Carl Nestler, Chattanooga, TN (US)

(72) Inventor: Helge Carl Nestler, Chattanooga, TN (US)

(*) Notice: Subject to any disclaimer, the term of this patent is extended or adjusted under 35 U.S.C. 154(b) by 0 days.

(21) Appl. No.: 16/732,408

(22) Filed: Jan. 2, 2020

(65) Prior Publication Data

US 2020/0216768 A1 Jul. 9, 2020

Related U.S. Application Data

(60) Provisional application No. 62/788,870, filed on Jan. 6, 2019.

(51) Int. Cl.
| | |
|---|---|
| *C10J 3/66* | (2006.01) |
| *C10J 3/72* | (2006.01) |
| *C10J 3/82* | (2006.01) |

(52) U.S. Cl.
CPC .............. *C10J 3/66* (2013.01); *C10J 3/721* (2013.01); *C10J 3/82* (2013.01); *C10J 2200/15* (2013.01); *C10J 2200/36* (2013.01); *C10J 2300/0916* (2013.01); *C10J 2300/0946* (2013.01); *C10J 2300/1603* (2013.01); *C10J 2300/1637* (2013.01); *C10J 2300/1653* (2013.01); *C10J 2300/1823* (2013.01)

(58) Field of Classification Search
CPC . C10J 3/62–66; C10J 3/82; C10J 3/84; C10K 1/046
See application file for complete search history.

(56) References Cited

U.S. PATENT DOCUMENTS

| | | | | | |
|---|---|---|---|---|---|
| 3,853,498 | A | * | 12/1974 | Bailie | F23G 5/027 48/209 |
| 4,340,397 | A | * | 7/1982 | Schulz | C10J 3/08 48/63 |
| 2007/0214719 | A1 | * | 9/2007 | Yoshikawa | C10J 3/463 48/61 |
| 2008/0307703 | A1 | * | 12/2008 | Dietenberger | C10J 3/57 48/76 |
| 2013/0023707 | A1 | * | 1/2013 | Keefer | C10L 3/104 585/312 |
| 2016/0200987 | A1 | * | 7/2016 | Appel | C10L 1/04 585/350 |
| 2018/0371322 | A1 | * | 12/2018 | Ackerson | C01B 3/36 |

* cited by examiner

*Primary Examiner* — Matthew J Merkling
(74) *Attorney, Agent, or Firm* — Miller & Martin PLLC; Stephen J. Stark

(57) ABSTRACT

A syngas generator has at least pyrolysis unit and a cracking unit which recycles treated input therein. The pyrolysis unit may recycle treated char to provide input heat for feedstock. The cracking unit may recycle syngas to assist in treating input gas/vapor mixture.

13 Claims, 3 Drawing Sheets

HIGHLY EFFICIENT AND COMPACT SYNGAS GENERATION SYSTEM

CLAIM OF PRIORITY

This application claims the benefit of U.S. Provisional Patent Application No. 62/788,870 filed Jan. 6, 2019, which is incorporated herein by reference in its entirety.

FIELD OF THE INVENTION

An object of the present invention is to potentially provide an efficient and/or compact system to convert organic material contained in organic waste, biomass, and/or other organic materials into a combustible, tar-reduced gas that may be utilized directly in such equipment an internal combustion machine or turbine for the generation of electricity, mechanical energy, and/or for other uses such as use in subsequent synthesis systems such as for the production of biodiesel, etc.

BACKGROUND OF THE INVENTION

A device for the pyrolysis and gasification of organic material such as organic household waste, wood waste, tires, plastics, or other hazardous organic components is commonly called a syngas generator. Syngas generators are used to provide a flammable gas/vapor mixture (syngas) for the direct generation of energy through such means as internal combustion machines or steam boilers, etc., for the synthesis of liquid hydrocarbons such as by the Fischer-Tropsch Synthesis or other techniques, and/or for other uses.

However, almost all of the organic materials suitable for the mentioned syngas generators have the following in common: they have a low energy density; and they are locally dispersed. This creates a challenge faced by this technology to either have a centralized large syngas plant where the organic material is transported to the plant from a large area or to have decentralized small syngas plants that are deployed in the area where the material is available in order to minimize transportation logistics.

While the specific investment costs as well the highest degree of utilization of the energy of a syngas system can be minimized by building centralized plants with a high capacity, the costs of the transportation of the feedstock increases since the materials will often need to be sourced from farther away. Because of the low energy density of the feedstock and the high transportation costs, economical reasons typically prohibit the realization of large centralized systems. Accordingly, there is a demand for smaller, decentralized syngas generators.

However, a disadvantage of smaller syngas generator units is the higher specific investment costs and lower energy efficiency. A challenge exists to find a suitable technology for decentralized units that may be balanced between investment costs and efficiency. The pyrolysis of organic material contains many chemical reactions that produce—besides the readily utilizable gaseous products—unwanted by products, especially large complex hydrocarbons commonly known as tars and soot, toxic components such as dioxins or organic acids. These byproducts prohibit the feedstock's direct utilization in an internal combustion machine because these byproducts cause early mechanical failure of the machine or in a downstream fuel synthesis plant.

The prior art of syngas generators has not yet made a commercially significant breakthrough mainly because of two reasons: (1) Low feedstock tolerance combined with a low throughput; and/or (2) Low syngas quality and the associated additional effort to clean the syngas prior to use in a subsequent process.

These two reasons lead to higher system cost due to increased size, inefficiencies, and additional process components, as well as higher maintenance and operational cost to obtain the desired product quality. The prior art syngas generators process the feed mainly by two different processes.

A first process is the Allothermal process. With the Allothermal process, the heat to maintain the pyrolysis is indirectly introduced to the product under the absence of oxygen. This process is typically a continuous process, accomplished through an indirectly heated auger reactor or an auger mixer that mixes a previously heated solid such as sand with the feedstock. The vapors of this process are predominantly used for the bio-oil production or direct combustion in a boiler. This principal has, due to the robustness of the auger, a very high feedstock tolerance towards humidity, particle size and melting behavior. Also, the principal does not generate high amounts of particles. When only the auger is heated from outside the heat transfer rate is low and hence the throughput is small, requiring large augers and surfaces to transfer the heat into product. The use of heat carriers such as sand requires a separate system for heating the sand and separating the sand from the char product; such a system significantly increases the complexity of the process and system cost. In practical applications such as for shredded wood particles, the particles are a mixture of fine and coarse particles. The larger particles in that mixture require a higher retention times for a complete pyrolysis in the reactor compared to the fines. The prior art addresses this issue by three measures: 1) Increasing the temperature which is limited by the materials of construction of the auger reactor or 2) By increasing the retention time which requires the reactor to be built longer which is limited by the cost and the size of the reactor. 3) Reducing the particle size to increase the heat transfer rates into the particles. On another aspect, with increasing throughput, the volume to surface ratio increases, which causes the reactor heat transfer into the particle to worsen due to the limited direct contact of the particles to the reactor. The prior art attempts to increase the throughput by using multiple small reactors or increase the residence time by using multiple reactors in series which complicates the system design and cost significantly with increasing throughput and particle diameter.

A second process is an Autothermal process. With an Autothermal process: the heat to maintain the Pyrolysis process is normally introduced by an under-stoichiometric combustion of the feedstock. The Autothermal pyrolysis process normally is accomplished by blowing air or oxygen into a fixed bed or a fluidized-bed reactor. The pyrolysis heat is generated by the partial combustion of the feedstock with the available oxygen. The heat causes the non-combusted organic matter to disintegrate by pyrolysis which drives out the vapors from the feedstock. Due to high temperatures, the tars and other complex molecules are cracked into smaller fragments (gasification) so that the amount of tars is lower compared to the before mentioned Allothermic Pyrolysis. Some processes even add steam into the Autothermic process to facilitate the cracking reactions towards components such as Hydrogen and Methane. The feedstock tolerance with regards to humidity, size distribution, and melting behavior is lower due to e.g. channeling and clogging in fixed bed reactors or specific weight distribution in fluidized bed reactors. The dust generation in the Autothermal pyrolysis process is significant and must be removed from the vapor stream with cyclones and filters.

The prior art syngas generators produce a vapor/solid/gas mixture that also has unwanted byproducts such as tars, particulate matter, and toxic substances such as dioxins, besides the desired gaseous and vaporous fractions. Especially Autothermic processes are hard to control because the pyrolysis reaction kinetics is strongly dependent on the particle sizes, water content and other contaminants such as sand. If the reaction kinetics changes for instance upon feedstock quality fluctuations the reaction is prone to either cool down and starve or overheats, which causes an excessive energy consumption and a low caloric syngas. Remember, direct combustion in an internal combustion machine or the synthesis of hydrocarbons from the gasified feedstock normally requires a very clean synthesis gas within tight quality specifications. Accordingly, the prior art of syngas generators commonly require several cleaning steps such as scrubbing and filtering prior to introduction into an internal combustion machine or synthesis process. These cleaning processes increase the cost, maintenance, and operation effort that usually renders smaller systems economically unfeasible.

Alternatively, direct combustion of the syngas in a steam boiler can be performed. Since steam boilers have higher tolerances towards tars and particulate matter and the combustion process is better controllable, most current syngas processes operate on a steam system to generate electricity.

Steam systems, however, are typically more inefficient when compared to the direct utilization in an internal combustion machine. Furthermore, a steam system is often more expensive in investment, maintenance, and operation due to the additional piping, pressure vessels, turbines, condensate polishing, and handling systems.

Accordingly, there is a need in the prior art for a system that provides all of the benefits of a compact syngas generator system with a high feedstock tolerance combined with a high throughput that produces a syngas product quality suitable for the direct utilization in an internal combustion machine or other chemical processes that have low specific investment, maintenance, and operation cost preferably by avoiding syngas cleaning processes.

BRIEF SUMMARY OF THE INVENTION

In view of the foregoing disadvantages inherent in the known types of syngas generators for the disintegration and gasification of organic matter and the subsequent utilization of the pyrolysis gaseous and liquid products for the generation of energy or as a feedstock for creating chemical compounds now present in the prior art, many embodiments of the present invention provide a compact process unit for the disintegration and gasification of organic feedstock that directly generates a high quality syngas for the direct utilization in an internal combustion machine or other chemical processes through at least one of (a) recycling treated feedstock to heat incoming feedstock; and/or (b) recycling syngas to mix with incoming gas/vapor mixture.

BRIEF DESCRIPTION OF THE DRAWINGS

The accompanying drawings illustrate the preferred embodiments of the invention and, together with the description, serve to explain the invention. These drawings are offered by way of illustration and not by way of limitation.

DETAILED DESCRIPTION OF THE INVENTION

Figure 1:
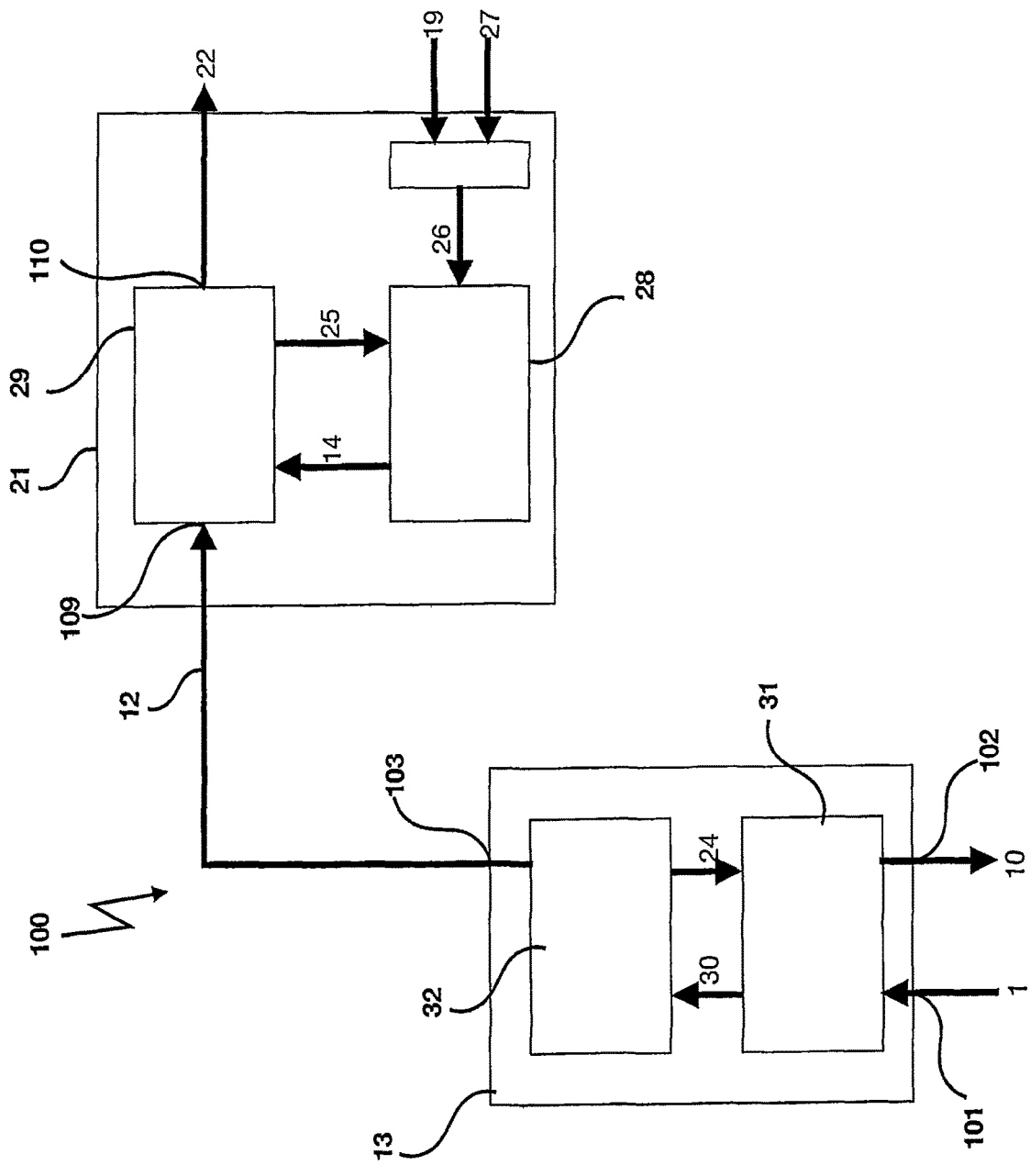
FIG. 1 illustrates, in accordance with embodiments of the present invention, a schematic diagram of the invention.

Referring now to FIG. 1 there is shown the block flow diagram of the invention. The feedstock, or educt 1, which may comprise any organic solid and/or pasty matter or mixtures of solid organic matter and/or liquid organic matter such as wood waste, plastics, organic household waste or tires is being disintegrated under heat and an oxygen deprived atmosphere in a pyrolysis unit 13. Liquid matter may also be educt 1 for some embodiments. The pyrolysis unit 13 may be heated and may operate at a certain elevated temperature, such as from 200-1200 C or more preferably about 600 C (for at least some wood waste as educt 1) to sustain a pyrolysis reaction. Products from the pyrolysis process of the treated educt 1 are: output char 10 and a gas/vapor mixture 12.

A first, often a primary, pyrolysis reactor 32 may be fed with a stream 30, which may preferably be a mixture of the educt 1, received at inlet 101, and a portion of hot, recycled char 106 from return auger 31. The recycled char 106 is believed to increase the average retention time of the educt 1 inside the primary auger 32 (and/or pyrolysis unit 13) for a higher conversion of the educt 1 and/or recycled char 10 into a gas/vapor mixture 12 as well as for an increase of the heat exchange rate into the feedstock or educt 1 that allows the reactor system 32 pyrolysis unit 13 and/or system 100 to be built more compact. Approximately 0 to 100 percent of treated char 24 (and preferably, 5-70 percent, 10-55 percent, 20-50 percent, 30-45 percent or about 38 percent) may be provided as recycled char 106 as opposed to output char 10 for at least some embodiments.

The char/educt mixture or stream 30 decomposes through introduced heat such as by one or more heaters 104,105 within heat chamber 11 such as with the primary auger 32 and/or return auger 31 into volatile liquid and/or gaseous products appearing as a gas/vapor mixture 12 that may be fed into a cracking reactor 21 and treated char 24 that may be fed into the return auger 31. The return auger 31 preferably recycles a portion of the treated char 24 back to the inlet of the primary auger 32 as return char 106 while another portion of the char 24 can be removed from the process as output char 10 at outlet 102. Alternatively, a certain particle size of the char from the primary auger 32 can be separated in a sieve 117 that can be placed in the receiver box 6 and fed to the Return Auger 31. This allows to selectively return only larger particles that require a higher retention time in the primary reactor 32. For wood as a feedstock approximately particle sizes of the treated char 24 larger than 4 millimeter (and preferably larger than 16 millimeter) may be provided as recycled char 106 as opposed to output char 10 for at least some embodiments. Return auger 31 preferably directs recycled char 106 in an opposite direction from primary auger 32 to be able to provide stream 30 when combined. Primary auger 32 may move educt 1 linearly (or not). Return Auger 31 may move recycled char 106 upwardly as well as rearwardly relative to a direction of motion of primary auger 32 so as to potentially provide a loop like system while removing gas/vapor mixture 12 and output char 10 from the loop.

A steam and/or cracking reactor 21 cracks higher hydrocarbons such as tars and other long chained or complex hydrocarbons as well as toxic components such as dioxins and furans into basic, gaseous components from the gas/vapor mixture 12. The cracking reactor 21 may be designed as a plug flow reactor with a loop where syngas 25 may be recycled back into the feed of the cracking reactor 21, possibly in a loop manner, as will be explained in further detail below. This may increase the average retention time of the syngas 25 in the system, which is believed to have the following advantages towards a plug flow reactor without recycling: (1) the system may be built more compact; (2) the system may provide a higher degree of unwanted byproduct conversion into syngas; and/or (3) the system may be operated at low temperatures to reduce unwanted carbon formation.

The cracking reactor 21 preferably operates at least at the temperatures of the pyrolysis auger reactor 32 for many embodiments. For the illustrated embodiment, temperature can be closer to 800 C, which can often be maintained by the partial combustion reaction occurring in the steam based cracking reactor 21 by injecting oxygen 107 and/or steam 108 as mixture 19. The steam 108 in the mixture 19 may be added to the cracking reactor 21 to ensure an excess of hydrogen radicals to assist in shifting the reactions taking place in the cracking reactor 21 towards gaseous components. The cracking products, also called syngas 22, leave the cracking reactor 21 for further use as will be explained below. Oxygen 107 and/or steam 108 injection as mixture or stream 19 may be introduced to maintain a cracking temperature and a steam cracking reaction in the cracking reactor 21. Stream 19 may also serve as a driving injector gas to maintain the recirculation and mixing of the gas/vapor mixture 12 with recycled gas 14. To maintain a constant recirculation in the cracking reactor 21 and when the reactor temperature is high enough so that the demand for stream 19 is too low to maintain a sufficient circulation in the cracking reactor 21, a portion of the syngas 22 may be recycled back as recycled syngas 27 into the cracking reactor 21.

The cracking reactor 21 may have a main reaction chamber 29 and a gas injector 28. The main reaction chamber 29 may preferably be formed as a single long pipe or multiple pipes in parallel that may include static mixing elements such as baffle plates and may be operated under a lower pressure than the pyrolysis reactor 13. The lower pressure may assist in directing a flow of the gas/vapor mixture 12 into the inlet 109 of the cracking reactor 29.

The gas/vapor mixture 12 may be mixed with hot recycled gas 14 at the inlet of the main reaction chamber 29 to potentially support the cracking reaction to occur in the cracking reactor 21, possibly in the reaction chamber. Towards an outlet 110 of the cracking reactor 29, a portion of the reaction products 25 may be introduced into the gas injector 28 to be mixed with stream 26 previously mixed with the oxygen/steam mixture 19 and/or possibly recycled syngas 27 as a propellant, to then be directed back into the reaction chamber 29 (possibly in a loop-like manner). Approximately 0 to 100 percent (and preferably 0-50 percent, 10-30 percent or about 22 percent) of the reaction products 25 may be combined with gas/vapor mixture 12 to provide mixture 113 for at least some embodiments.

The added oxygen 107 may react with a portion of the recycled syngas 25 and/or 27. A heat of reaction preferably provides the necessary temperature increase to sustain the cracking reaction in the reactor 29 although heater(s) 111 may be useful (at least at startup).

Figure 2:
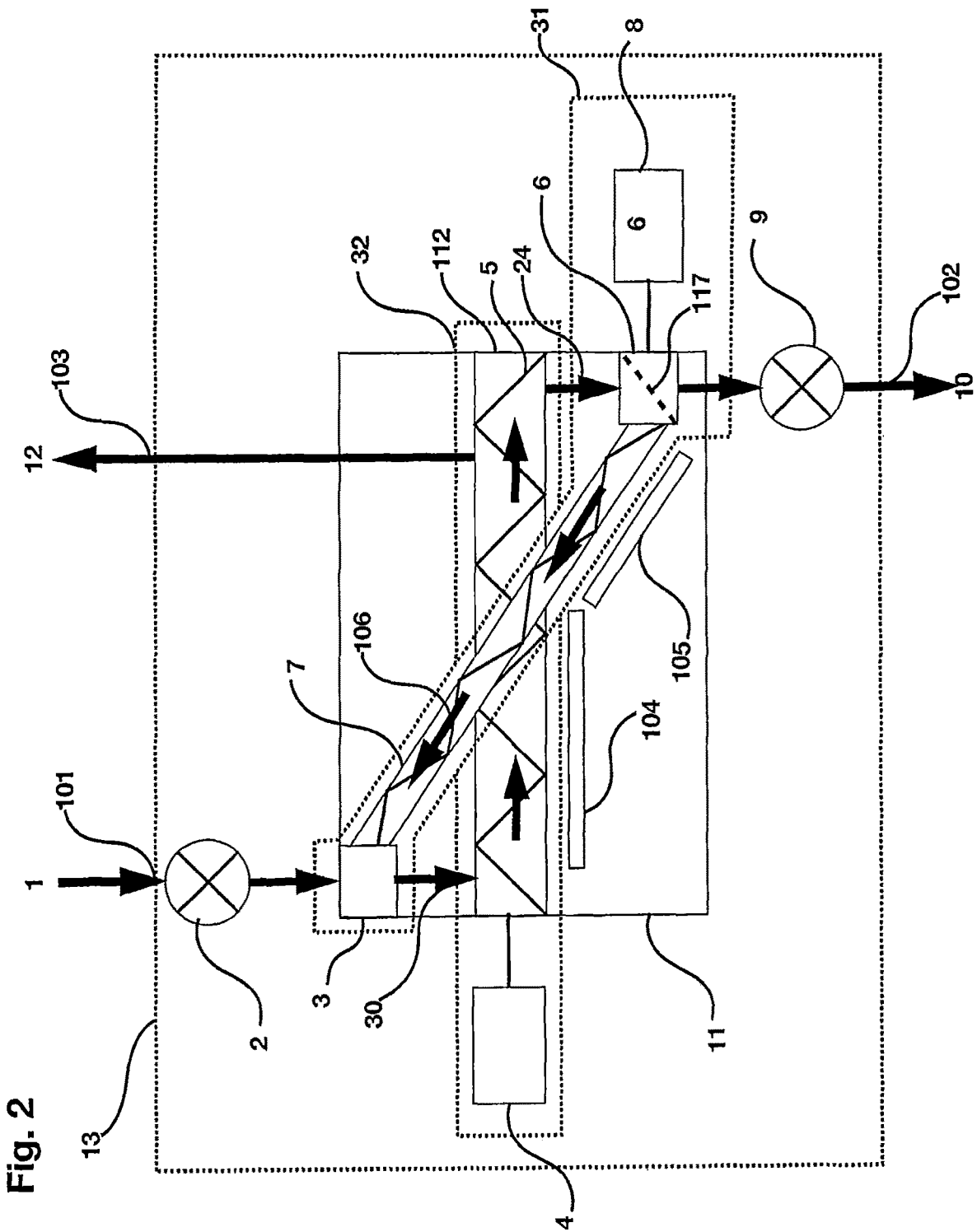
FIG. 2 illustrates, in accordance with embodiments of the present invention, a schematic flow diagram of the pyrolysis reactor shown in FIG. 1.

Referring now to FIG. 2: A more detailed description of the pyrolysis reactor 13 is shown in FIG. 2. The feedstock, or educt 1, may be introduced at an inlet 101 such as through a valve 2 such as an air tight gate such as a rotary gate valve and introduced into a receiver 3. Receiver 3 may be a portion of primary reactor 32 or of the return reactor 31 where the feedstock may be mixed with a portion of the hot or treated char 24 that was transported by the return auger 7 driven by motor 8 through a receiver box 6 located at the distal end of the primary auger reactor 32.

The reactor(s) 31,32 are preferably operated under a slightly lower pressure than the surrounding environment. The mixture 30 of treated char 106 and educt 1 may be introduced in the primary reactor 32 at inlet 30. The primary reactor 32 may have a main auger 5 which can be a single, double or multiple auger combination with an inlet 30 and outlet 24. The return auger 31 may be designed to consist of multiple single return augers to increase the heat transfer surface between the auger wall towards the returned particles 106 and the heating chamber 11 and/or heating element 105. The main auger 5 may be driven by an electric motor 4. The primary reactor 32 may be at least partially externally heated by being situated inside a heating chamber 11 with heater(s) 104 and/or 105. The heating chamber 11 may operate at a certain elevated temperature(s), such as from 200-1200 C or more preferably about 500 C for wood waste as educt 1 to sustain a pyrolysis reaction along the main auger 5.

The primary auger 5 preferably conveys the mixture 30 through the heated chamber 11 where the pyrolysis reaction preferably takes place. The mixture 30 may emit under the heated environment a gas/vapor mixture 12 that may be drawn out of the primary reactor 32 from outlet 103. The remainder may be treated char 24 that may be released from toward or at the distal end 112 of the primary reactor 32. The treated char 24 may fall into a receiver box 6 where the material may be screened by sieve 117 and a portion of the screened material char 10 may leave the pyrolysis reactor 13 through a gate valve 9 or other device at outlet 102, if not recycled as explained above.

Figure 3:
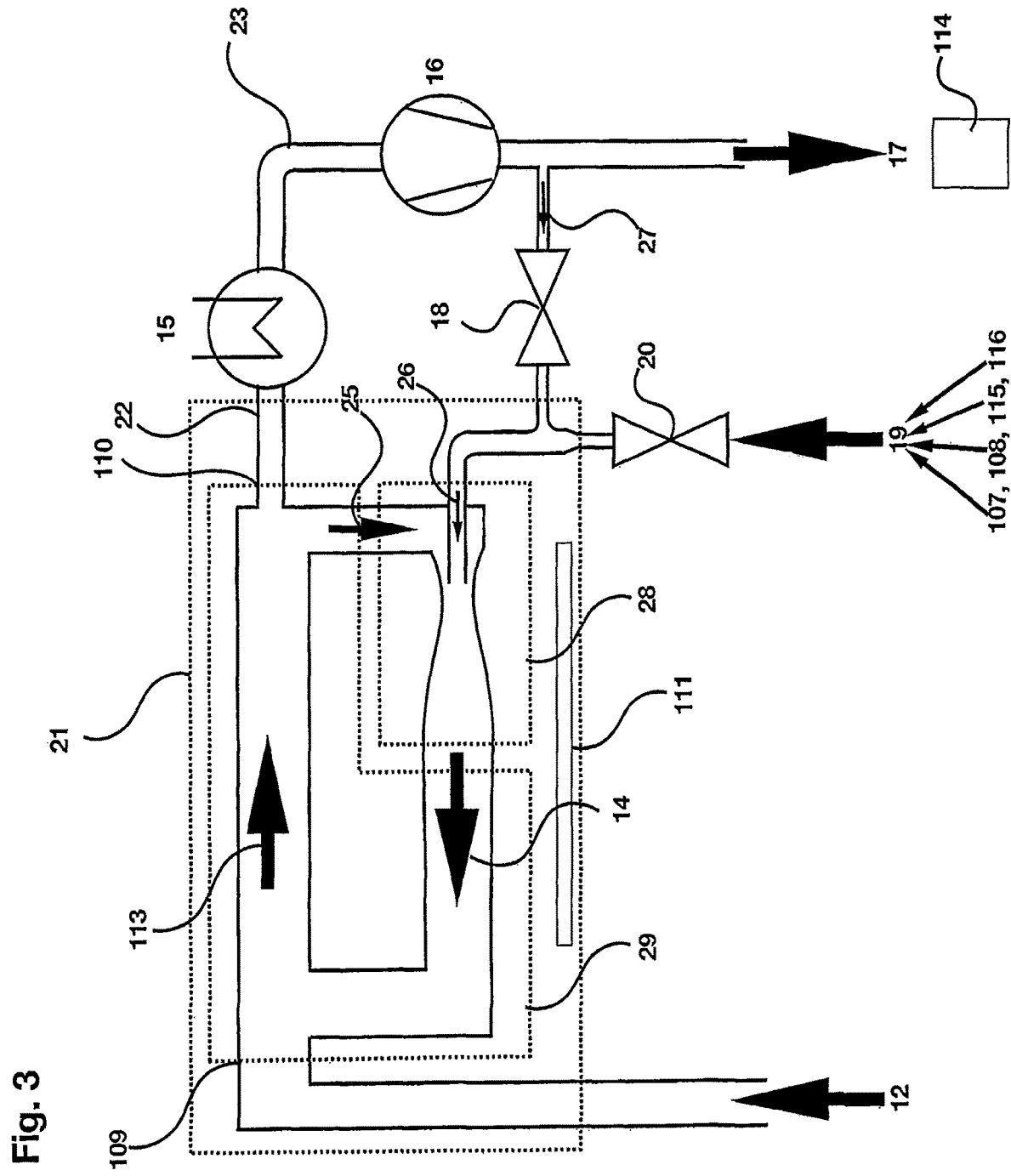
FIG. 3 illustrates, in accordance with embodiments of the present invention, a schematic flow diagram of the cracking reactor shown in in FIG. 1.

A more detailed description of the cracking reactor 21 is shown in FIG. 3. The cracking reactor 21 may be operated under a lower pressure by means of compressor 16 than the connected pyrolysis reactor 13. The gas/vapor mixture 12 from the outlet 103 pyrolysis reactor 13 flows into the main reaction chamber 29 from the inlet 109 of the cracking reactor 21 where it preferably mixes with the hot recycled gas 14.

The temperature of the vapor/gas mixture 113 is between 500 C-1200 C, preferably it has about or even the same temperature as the operating temperature of the pyrolysis reactor 13. The elevated temperature of the mixture 113 preferably initiates the cracking process of the gas/vapor mixture 12. At the distal end of the cracking reactor 29 a portion of the cracked gas (syngas) 22 preferably flows through a cooler 15. The cooled gas 23 may be compressed by a compressor 16. A portion of the compressed syngas 17 may leave the reactor 21 for the direct use in any subsequent process such as an internal combustion machine 114 or other chemical synthesis processes such as the production of fuel, plastics, and/or other process. A control valve 18 may control a flow of recycled syngas 27. A control valve 20 may control the mixture 19, which may comprise a mixture of oxygen 107 and/or steam 108 and/or evaporated or gaseous combustible agent 116 with a flame point below 600 C (preferably below 300 C), such as hydrocarbons, such as Diesel oil to support the initial ignition of the cracking reaction and/or inert gas such as nitrogen 115 or other gas when air is used as an oxygen carrier. The two streams 27 and/or 19 may be mixed to form the input 26 that may be introduced into the gas injector 28, possibly as a propellant.

The bypass stream 25 in the injector 28 may heat up the input 26. Once the injected gas mixture input 26 reaches a sufficiently high temperature, the available oxygen in the injector 28 may react with the combustible syngas 25. The released energy of the oxidation reaction preferably provides the energy (and heat) required to sustain the endothermic cracking process in the cracking reactor 21. The cracking reactor 21 (such as the main reaction chamber 29 and the gas injector 28) are preferably lined with high temperature resisting materials such as ceramics. Presently preferred ceramic liners can be made from A1202, Silicon Carbide, Si02, and/or Fire Clay with very low iron contents, such as lower than about 0.1%.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention.

Having thus set forth the nature of the invention, what is claimed herein is:

1. An improved syngas generating system comprising:
a pyrolysis reactor having
an inlet receiving input educt;
a primary reactor with a conveyor moving input educt from an inlet towards a first end to an outlet towards a second end of the conveyor, said primary reactor heating the input educt to provide treated educt; and
a return reactor receiving at least some treated educt from towards the second end of the conveyor and directing and heating the treated educt to the inlet of the primary reactor to provide a stream with the input educt;
a char outlet removing at least some treated educt from the pyrolysis reactor as char; and
a gas outlet, said gas outlet directing a gas/vapor mixture from the pyrolysis reactor; and a cracking reactor having
an inlet receiving the gas/vapor mixture from the gas outlet of the pyrolysis reactor which is cracked to provide reaction products comprising syngas and recycled gas, with the recycled gas derived from the reaction products and remaining within the cracking reactor, and
a recirculation stream propellant selected from the group of syngas, steam, gaseous combustible agent and inert gas assisting in directing the recycled gas remaining in the cracking reactor to mix with the gas/vapor mixture, and
an outlet directing at least some syngas from the cracking reactor;
wherein the cracking reactor treats the gas/vapor mixture with at least one of reaction products and recycled syngas derived from the reaction products to provide a stream cracked in a reaction chamber forming the syngas, the syngas directed from the outlet.

2. The improved syngas generating system of claim 1 wherein the cracking reactor operates at a lower pressure than the pyrolysis reactor.

3. The improved syngas generating system of claim 2 further comprising a compressor connector to the cracking reactor.

4. The improved syngas generating system of claim 1 wherein the return reactor receives the treated educt and conveys the treated educt upwardly to an elevation above the inlet.

5. The improved syngas generating system of claim 4 wherein the conveyor of the return reactor is an auger.

6. The improved syngas generating system of claim 1 wherein the conveyor of the primary reactor is an auger, and a sieve receives treated char and selectively directs larger particles back to the conveyor.

7. The improved syngas generating system of claim 1 wherein the cracking reactor treats the gas/vapor mixture with at least one of reaction products and recycled syngas derived from the reaction products to provide a stream cracked in a reaction chamber forming the syngas, the syngas directed after passing out of the outlet.

8. An improved syngas generating system comprising: An improved syngas generating system comprising:
a pyrolysis reactor having
an inlet receiving input educt;
a primary reactor with a conveyor moving input educt from an inlet towards a first end to an outlet towards a second end of the conveyor, said primary reactor heating the input educt to provide treated educt; and
a return reactor receiving at least some treated educt from towards the second end of the primary reactor and directing and heating the treated educt to the inlet of the primary reactor to provide a stream with the input educt;
a char outlet removing at least some treated educt from the pyrolysis reactor as char; and
a gas outlet, said gas outlet directing gas/vapor mixture from the pyrolysis reactor; and a cracking reactor having
an inlet receiving the gas/vapor mixture from the gas outlet of the pyrolysis reactor, and
an outlet directing syngas from the cracking reactor;
wherein the cracking reactor treats the gas/vapor mixture with at least one of reaction products and recycled syngas derived from the reaction products to provide a stream cracked in a reaction chamber forming the syngas, the syngas directed from the outlet; and
wherein the reaction products are directed from within the cracking reactor to mix with the gas/vapor mixture internal to the reaction chamber.

9. The improved syngas generating system of claim 8 wherein the reaction products are directed through a gas injector to the reaction chamber.

10. The improved syngas generating system of claim 9 wherein the gas injector receives at least one of oxygen, steam and recycled syngas as a propellant.

11. The improved syngas generating system of claim 1 further comprising a cooler, said cooler cooling syngas after leaving the outlet providing cooled syngas.

12. The improved syngas generating system of claim 11 wherein at least some cooled syngas is provided as bypass syngas into the cracking reactor.

13. The improved syngas generating system of claim 11 wherein at least some cooled syngas is provided to at internal combustion engine, or serving as raw material for a chemical process.

* * * * *